Inventor
ROBERT L. OHLS
By E. V. Hardway.
Attorney

June 10, 1952   R. L. OHLS   2,599,774
VALVE ASSEMBLY
Filed May 6, 1947   2 SHEETS—SHEET 2

Inventor
ROBERT L. OHLS
By E. V. Hardway
Attorney

Patented June 10, 1952

2,599,774

UNITED STATES PATENT OFFICE 2,599,774

VALVE ASSEMBLY

Robert L. Ohls, Houston, Tex.

Application May 6, 1947, Serial No. 746,411

4 Claims. (Cl. 251—113)

This invention relates to a valve assembly.

An object of the invention is to provide in a valve assembly novel means for sealing the valve with the casing to prevent leakage whether the valve be opened or closed.

Another object is to provide a plug type valve assembly wherein the plug valve is balanced axially under fluid pressure with a novel type of sealing means for forming fluid tight seals under the influence of fluid pressure thus dispensing with close fits.

A further object is to provide a valve assembly embodying a plug type valve and which is of simple construction having a minimum of parts that may be cheaply and easily constructed and assembled.

It is a further object of the invention to provide a novel type of seal ring which has been specially designed for forming a seal between a valve and casing but which is capable of general use for forming a seal between two relatively rotatable parts.

Other objects and advantages will be apparent from the following specification which is illustrated by the accompanying drawings wherein.

Figure 1:
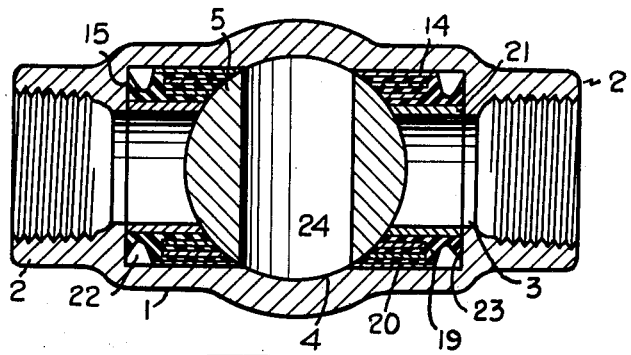
Figure 1 is a transverse, sectional view of the assembly.

Referring now more particularly to the drawings, wherein like numerals of reference designate the same parts in each of the figures, the numeral 1 designates the valve casing, preferably formed with internally threaded connections 2, 2 for connecting the casing into a flow line, said casing also having a flowway 3 passing therethrough from one connection through the other.

The valve casing is provided with a cylindrical valve seat 4 therethrough at substantially right angles to the flowway 3 and fitted into this seat there is an approximately cylindrical plug valve 5 which extends each way beyond the casing and is provided with external annular keyways 6, 7 around said projecting ends adjacent the corresponding ends of the casing and in these keyways are the keys 8 and 9 in the form of flexible snap rings which retain the valve against displacement.

Around the valve casing on opposite sides of the flowway 3 there are the internal annular grooves 10, 11 in which are seated the seal rings 12, 13, preferably of the O-ring type, which form effective seals between the ends of the plug 5 and the corresponding ends of the casing 1.

The casing 1 is internally counterbored around the flowway 3 thus providing the seal ring seats 14, 15 to receive the seal rings designated generally by the numerals 17, 18. These seal rings are of similar construction. They are composed of an annular body 19 of resilient material which is reinforced by means of spaced concentric rings 20 composed of durable material such as metal, fabric or other suitable material.

Each seal ring is, preferably, provided with an inside sleeve-like support 21, preferably of metal. The inner end of each seal ring is arcuate to conform in shape to, and to fit around, the plug valve when installed. Their outer ends are each provided with an annular groove, as 22, thus forming annular outwardly flared end lips, as 23.

When the seal rings 17, 18 are installed in their seats around the valve the lips 23 will press against the opposing end faces of the seats 14, 15 and thus initially form tight seals, even though there be no fluid pressure exerted against them.

The plug valve 5 is provided with a transverse bore 24 and one end of the valve is provided with an outstanding web 25 having a hole 26 therethrough which a suitable handle may be inserted to turn the plug valve to align the bore 24 with the flowway 3 to open the valve or to turn it out of such alignment to close the valve.

The reinforcing, as 20, above referred to, will shield the resilient material and cause it to maintain its shape and position as the margins of the flowway pass the inner surface of said seal ring. These margins, presenting rather sharp edges, would otherwise distort and injure the seal rings.

When the valve, above described is installed and under pressure the downstream seal ring is the one that prevents the leakage when the valve is in closed position and any fluid passing around the valve from the upstream side will enter the groove 22 of the downstream seal ring and force the corresponding lip tightly against the opposing face of the valve casing thus making a very efficient seal and, if desired, the valve casing may be provided with inside ducts 27 which enter said grooves to facilitate the passage of fluid leaking around the valve into said groove.

When in open position, the seal rings 17, 18 will fit snugly against the plug valve and will not allow sediment or gritty substances passing through the flowway to enter between the valve and the valve casing.

If desired the reinforcement for the seal ring 17, 18 may be spiralled rather than concentric as shown.

Figure 3:
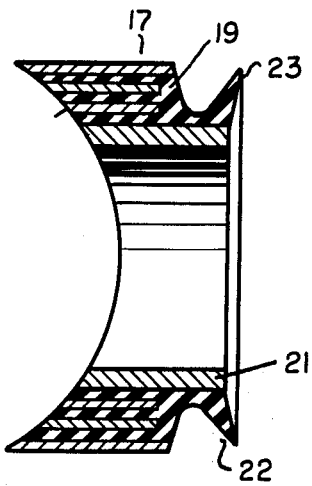
Figure 3 is an enlarged, sectional view of a seal ring employed.
Figure 4:
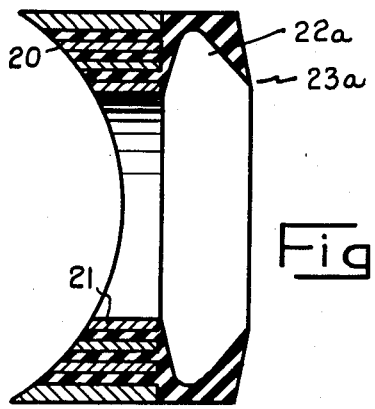
Figure 4 is an enlarged, sectional view of another embodiment of the seal ring.

In lieu of the type of ring shown in Figure 3 an alternate form, as shown in Figure 4, may be employed wherein the annular groove as 22a is an inside groove rather than an external groove, as shown in Figure 3, thus providing the inside annular lip 23a whose outer side converges outwardly so that when seal rings of this type are employed the lips 23a will press against the outer ends of the seats 14, 15 to form initial seals independent of the fluid pressure. When this type of seal ring is employed the upstream seal ring will prevent any leakage by reason of the fact that the oncoming fluid, under pressure, will enter the groove 22a and press the lip 23a firmly against the upstream end of the casing seat; also when the type of seal ring, shown in Figure 4, is employed the inside ducts 27 will not be necessary.

Figure 2:
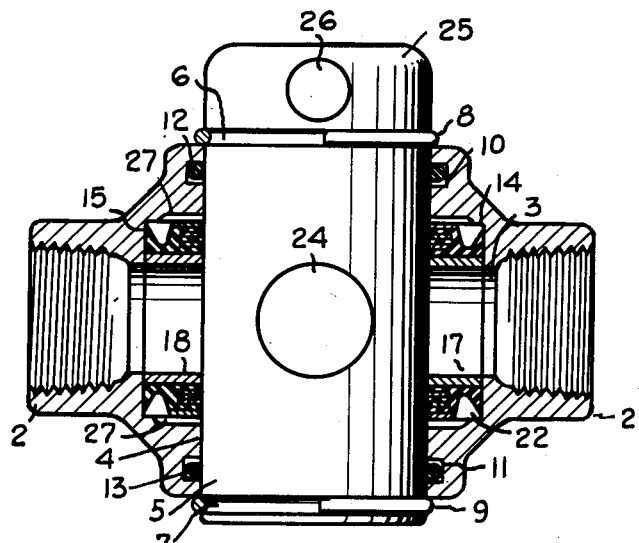
Figure 2 is a sectional view taken longitudinally of the valve.
Figure 5:
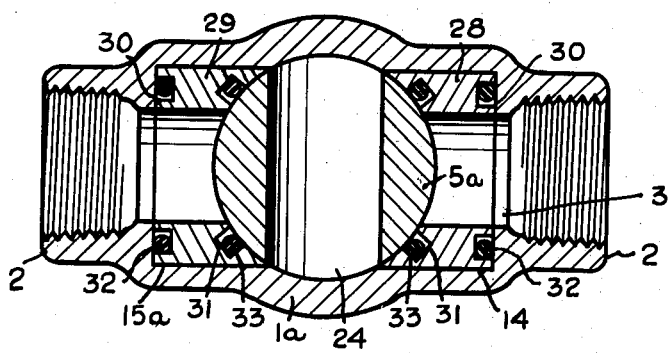
Figure 5 is a sectional view of another embodiment of the invention taken at right angles to the valve.
Figure 6:
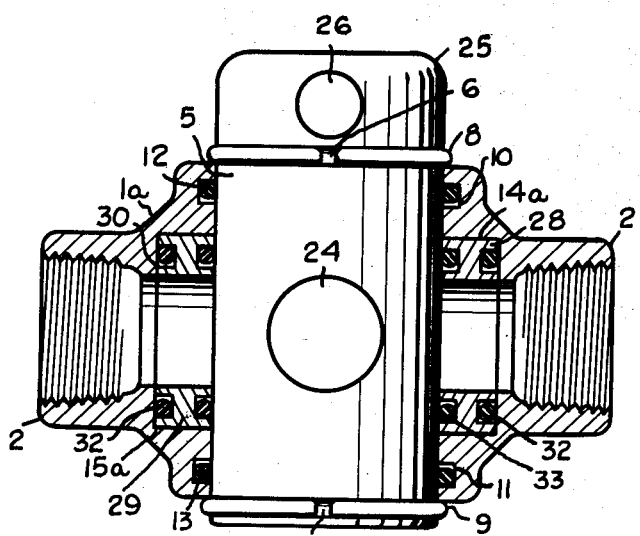
Figure 6 is a sectional view thereof taken longitudinally of the valve.

Referring to Figures 5 and 6, there is a casing 1a substantially similar to the casing 1 excepting the ducts 27 are omitted. In this embodiment of the assembly in the seal ring seats 14a and 15a the seal rings are formed of rigid rings 28, 29 having annular grooves, as 30, 31, in the outer and inner ends thereof, respectively, with seal rings 32, 33 in said grooves, said rings being preferably of the O-ring type, the former sealing against the outer ends of the seats 14a, 15a and the latter sealing against the valve plug 5. In other respects the form shown in Figures 5 and 6 is substantially the same as that shown in Figures 1 and 2.

Figure 7:
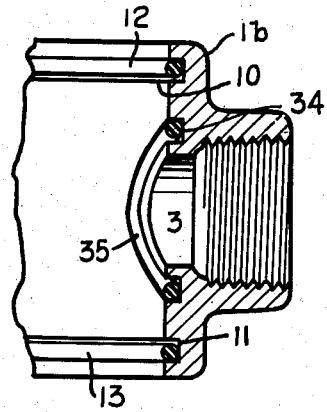
Figure 7 is a fragmentary, sectional view of the valve casing illustrating another embodiment of the invention.

In the embodiment illustrated in Figure 7 the valve casing 1b is provided, at each end, with an inside annular groove 34 around the flowway 3 and seated in these grooves are the seal rings 35, preferably of the O-ring type which form efficient seals between the plug valve and the valve casing around the flowway for the fluid.

The drawings and description are illustrative merely while the broad principle of the invention will be defined by the appended claims.

What I claim is:

1. A plug valve assembly comprising, a casing having a flowway therethrough and provided with inside, annular, countersunk seats around the flowway, a plug type valve in the casing extending transversely of the flowway and having a transverse bore movable into and out of registration with the flowway, seal rings in the seats and in sealing relation with the valve, the outer ends of each of the said seal rings having an annular groove forming a tapering annular lip adapted to press against the adjacent wall of its adjoining seat to form a fluid tight joint therewith said sealing rings being formed of resilient material and annular layers of durable material concentrically arranged alternately with the resilient material with the inner margins of said layers flush with the inner surface of the resilient material.

2. A plug valve assembly comprising, a casing having a flowway therethrough and provided with inside, annular, countersunk seats around the flowway, a plug type valve in the casing extending transversely of the flowway and having a transverse bore movable into and out of registration with the flowway, seal rings in the seats and in sealing relation with the valve, the outer ends of each of the said seal rings having an internal annular groove forming a tapering annular lip adapted to press against the adjacent wall of its adjoining seat to form a fluid tight joint therewith said seal rings being formed of resilient material and annular layers of durable material in each ring concentrically arranged alternately with the resilient material with the inner margin of the layers flush with the inner surface of the resilient material.

3. A plug valve assembly comprising, a casing having a flowway therethrough and provided with an inside, annular, countersunk seat around the flowway, a plug type valve in the casing extending transversely of the flowway and having a transverse bore movable into and out of registration with the flowway, a seal ring in the seat whose outer end is formed with an annular lip which bears against the outer end of the seat and whose inner end is curved to conform to the shape of and to fit against the valve, said seal ring being formed of resilient material and layers of durable material arranged alternately with the resilient material with the inner margins of said layers flush with the inner surface of the resilient material.

4. In a valve assembly a seal ring composed of resilient material one end of which is formed into an annular lip and whose other end is arcuate to conform to the shape of and to fit against a cylindrical object, said seal ring having layers of durable material in alternate relation with the resilient material with the margins of the durable material flush with the arcuate end of the seal ring.

ROBERT L. OHLS.

REFERENCES CITED

The following references are of record in the file of this patent:

UNITED STATES PATENTS

| Number | Name | Date |
| --- | --- | --- |
| 1,330,429 | Campbell | Feb. 10, 1920 |
| 1,593,325 | Atwood | July 20, 1926 |
| 1,954,018 | Miller | Apr. 10, 1934 |
| 2,030,458 | McKellar | Feb. 11, 1936 |
| 2,191,232 | Reinen | Feb. 20, 1940 |
| 2,243,227 | Stratton | May 27, 1941 |
| 2,392,198 | Snyder | Jan. 1, 1946 |
| 2,480,529 | Waag | Aug. 30, 1949 |